US008787305B2

(12) United States Patent  
Michels et al.

(10) Patent No.: US 8,787,305 B2
(45) Date of Patent: Jul. 22, 2014

(54) METHOD AND APPARATUS FOR SCHEDULING PEER-TO-PEER COMMUNICATION LINKS

(75) Inventors: James P. Michels, Lake Zurich, IL (US); Michael H. Baker, Elmhurst, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 102 days.

(21) Appl. No.: 13/339,586

(22) Filed: Dec. 29, 2011

(65) Prior Publication Data

US 2013/0170468 A1 Jul. 4, 2013

(51) Int. Cl.
*H04W 4/00* (2009.01)
(52) U.S. Cl.
USPC ........................................... 370/330
(58) Field of Classification Search
None
See application file for complete search history.

(56) References Cited

U.S. PATENT DOCUMENTS

| | | | |
|---|---|---|---|
| 5,535,240 | A | 7/1996 | Carney et al. |
| 5,758,090 | A | 5/1998 | Doner |
| 5,848,097 | A | 12/1998 | Carney et al. |
| 6,339,694 | B1 | 1/2002 | Komara et al. |
| 8,305,972 | B2 | 11/2012 | Baker et al. |
| 8,565,183 | B2 | 10/2013 | Banerjea |
| 2004/0125776 | A1 | 7/2004 | Haugli et al. |
| 2005/0239451 | A1* | 10/2005 | Periyalwar et al. ........... 455/425 |
| 2005/0281221 | A1 | 12/2005 | Roh et al. |
| 2006/0126749 | A1 | 6/2006 | Armour et al. |
| 2007/0019668 | A1 | 1/2007 | Lee et al. |
| 2007/0081491 | A1 | 4/2007 | Kim et al. |
| 2007/0104087 | A1 | 5/2007 | Tee et al. |
| 2007/0104129 | A1 | 5/2007 | Yang et al. |
| 2007/0115880 | A1 | 5/2007 | Huh et al. |
| 2007/0121547 | A1 | 5/2007 | Huh et al. |
| 2007/0121666 | A1 | 5/2007 | Kim et al. |
| 2007/0155337 | A1 | 7/2007 | Park et al. |
| 2007/0173198 | A1 | 7/2007 | Kim et al. |
| 2007/0201398 | A1 | 8/2007 | Yang et al. |
| 2007/0201400 | A1 | 8/2007 | Kang et al. |
| 2008/0069062 | A1 | 3/2008 | Li et al. |

(Continued)

FOREIGN PATENT DOCUMENTS

CN 1875587 A 12/2006
KR 1020060048938 A 5/2006

(Continued)

OTHER PUBLICATIONS

Chinese Office Action for counterpart Patent Application No. 201080005773.9 mailed Aug. 27, 2013 English Abstract.

(Continued)

*Primary Examiner* — Chi Pham
*Assistant Examiner* — Kouroush Mohebbi
(74) *Attorney, Agent, or Firm* — Steven A. May

(57) ABSTRACT

An evolved Node B creates or updates peer sets from measured performance information received from one or more stations. The measured performance information includes at least one quality metric associated with a downlink signal sent from the evolved Node B to the one or more stations. The evolved Node B determines excluded timeslots and preferred timeslots based on current resource assignments in each timeslot and based on the peer sets, marks potential resources in an uplink portion of a resource allocation map, and allocates one of the potential resources for peer-to-peer communication between a transmitter station and one or more receiver stations.

20 Claims, 9 Drawing Sheets

(56) References Cited

U.S. PATENT DOCUMENTS

| | | | |
|---|---|---|---|
| 2008/0240267 | A1 | 10/2008 | Hassan et al. |
| 2008/0274729 | A1 | 11/2008 | Kim et al. |
| 2009/0005057 | A1* | 1/2009 | Lee et al. ............... 455/450 |
| 2009/0011768 | A1 | 1/2009 | Seok et al. |
| 2009/0011770 | A1 | 1/2009 | Jung et al. |
| 2009/0016225 | A1 | 1/2009 | Laroia et al. |
| 2009/0016295 | A1* | 1/2009 | Li et al. ............... 370/330 |
| 2009/0034447 | A1 | 2/2009 | Yu et al. |
| 2009/0092055 | A1 | 4/2009 | Balasubramanian et al. |
| 2009/0131061 | A1 | 5/2009 | Palanki et al. |
| 2009/0175178 | A1 | 7/2009 | Yoon et al. |
| 2009/0181692 | A1 | 7/2009 | Gaal et al. |
| 2009/0303939 | A1 | 12/2009 | Umesh et al. |
| 2010/0008244 | A1 | 1/2010 | Sampath et al. |
| 2010/0169498 | A1 | 7/2010 | Palanki et al. |
| 2010/0189046 | A1 | 7/2010 | Baker et al. |
| 2010/0189048 | A1 | 7/2010 | Baker et al. |
| 2010/0202313 | A1 | 8/2010 | Barratt et al. |
| 2010/0260093 | A1 | 10/2010 | Liu et al. |
| 2010/0260132 | A1 | 10/2010 | Rao |
| 2011/0019596 | A1 | 1/2011 | Li et al. |
| 2011/0282989 | A1 | 11/2011 | Geirhofer et al. |
| 2012/0093098 | A1 | 4/2012 | Charbit et al. |
| 2012/0106517 | A1 | 5/2012 | Charbit et al. |
| 2012/0327889 | A1 | 12/2012 | Sayeedi |
| 2013/0170476 | A1 | 7/2013 | Baker et al. |

FOREIGN PATENT DOCUMENTS

| | | |
|---|---|---|
| WO | 2006135019 A1 | 12/2006 |
| WO | 2010049801 A1 | 5/2010 |
| WO | 2010088154 A2 | 8/2010 |

OTHER PUBLICATIONS

European Search Report for counterpart Patent Application No. 10736266.7 mailed Sep. 24, 2013.

Non Final Office Action mailed Jan. 2, 2014 in U.S. Appl. No. 12/360,220, filed Jan. 27, 2009.

Ciochina, C. et al., An Analysis of OFDM Peak Power Reduction Techniques for WiMAX systems, IEEE ICC 2006 Proceedings, pp. 4676-4681.

Christoph R., "Effects of HPA-Nonlinearity on a 4-DPSK/OFDM-Signal for a Digital Sound Broadcasting System," 2nd European Conference on Satellite Communications, Oct. 22-24, 1991, pp. 179-184.

Draft Standard for IEEE 802.11n D2.00, Part 11: Wireless LAN Medium Access Control (MAC) and Physical Layer (PHY) specifications, Feb. 2007, p. 294.

"Electromagnetic compatibility and Radio spectrum Matters (ERM); ElectroMagnetic Compatibility (EMC) standard for radio equipment and services; Part 1: Common technical requirements," ETSI EN 301 489-1 V1.8.1, 45 pages, (Apr. 2008).

FCC 0FR47 [B8], Section 15.

Kim, H.J. et al., "Adaptive clipping technique for reducing PAPR on OFDM systems", IEEE VTC-2003 Fall. 2003 IEEE 58th, vol. 3, Oct. 6-9, 2003, pp. 1478-1481 vol. 3.

IEEE Standard for Local Metropolitan area networks, Part 16: Air Interface for Fixed Broadband Wireless Access Systems, p. 631, Oct. 2004.

International Search Report & Written Opinion for related International Application No. PCT/US2012/071150 mailed on Mar. 13, 2013.

International Search Report and Written opinion for International Application No. PCT/US2010/021778 mailed on Aug. 5, 2010.

International Search Report and Written opinion for International Application No. PCT/US2010/021801 mailed on Aug. 6, 2010.

International Search Report and Written Opinion for counterpart International Patent Application PCT/US2012/069812 mailed Feb. 12, 2013.

IST-2003-507581 Winner D2.2 V.1.0, "Feasibility of Multi-Bandwidth Transmissions", Oct. 2004.

IST-2003-507581 Winner D7.7 V.1.0, "Winner System Concept Complexity Estimates", Month 24, p. 31.

Non Final Office Action mailed Dec. 30, 2011 in related U.S. Appl. No. 12/360,428, filed Jan. 27, 2009.

Non Final Office Action mailed Mar. 16, 2012 in related U.S. Appl. No. 12/360,220, filed Jan. 27, 2009.

Non Final Office Action mailed Oct. 21, 2013 in related U.S. Appl. No. 13/339,518, filed Dec. 29, 2011.

Notice of allowance mailed on Jun. 7, 2012 in related U.S. Appl. No. 12/360,428, filed Jan. 27, 2009.

Office Action mailed Dec. 5, 2011 in related U.S. Appl. No. 12/360,220, Michael H. Baker, filed Jan. 27, 2009.

* cited by examiner

METHOD AND APPARATUS FOR SCHEDULING PEER-TO-PEER COMMUNICATION LINKS

RELATED APPLICATIONS

The present application is related to the following United States Patent Applications commonly owned with this application by Motorola Solutions, Inc.: Ser. No. 12/360,428, filed Jan. 27, 2009, titled "Proactive Scheduling Methods And Apparatus To Enable Peer-To-Peer Communication Links In A Wireless OFDMA System", Ser. No. 12/360,220, filed Jan. 27, 2009, titled "Reactive Scheduling Methods And Apparatus To Enable Peer-To-Peer Communication Links In A Wireless OFDMA System", and Ser. No. 13/339,518, filed Dec. 29, 2011, titled "Method And Apparatus For Scheduling Various Types Of Peer-To-Peer Communication Links", the entire contents of each are incorporated herein by reference.

FIELD OF THE DISCLOSURE

The present disclosure relates generally to wireless communications and more particularly to methods and apparatus for scheduling resources in Orthogonal Frequency-Division Multiple Access (OFDMA) communication networks for peer-to-peer communications among stations operating therein.

BACKGROUND

Orthogonal Frequency-Division Multiple Access (OFDMA) is a multiple access method for sharing a radio frequency (RF) channel among multiple stations. OFDMA uses an orthogonal frequency-division multiplexing (OFDM) digital modulation scheme to modulate information signals. OFDMA can be described as a combination of frequency domain and time domain multiple access. In OFDMA, a communication space is divided into multiple timeslots and each timeslot is further divided into a number of frequency sub-channels, each having at least one of its own sub-carriers. In OFDMA systems, both time and/or frequency resources are used to separate signals to/from multiple stations, wherein transmissions to/from multiple stations are separated using timeslots and sub-channels within each timeslot such that stations' signals can be separated in the time domain and/or in the frequency domain. Thus, in OFDMA, resources can be partitioned in the time-frequency space.

Recently, broadband wireless networks have been developed that implement OFDMA. The Institute of Electrical and Electronics Engineers (IEEE) 802.16 networks are one example. As used herein, "IEEE 802.16" refers to a set of IEEE Wireless Metropolitan Area Network (WMAN) standards that govern broadband wireless access methods. Any of the IEEE standards or specifications referred to herein may be obtained at IEEE, 445 Hoes Lane, PO Box 1331, Piscataway, N.J. 08855-1331, USA. In addition, a Long Term Evolution (LTE) project has been created to provide for a high speed wireless data communications network. LTE is a Third Generation Partnership Project (3GPP) project developed by the European Telecommunications Standards Institute (ETSI). In a LTE network, an evolved Node B (eNB) is a mandatory node in a radio access network (RAN) portion of the LTE network. Similar to a base station in an 802.16 WMAN, the eNB in the LTE network handles radio communications with multiple devices in a cell and carries out radio resource management and handover decisions. Similar to the subscriber station (SS) in an 802.16 WMAN, the user equipment (UE) in the LTE network serves as a device that communicates with the eNB. The user equipment and/or the subscriber station are referred to in this document as a station. Any of the ETSI standards or specifications referred to herein may be obtained at 650, Route des Lucioles, 06921 Sophia-Antipolis Cedex, FRANCE.

In a wireless communication system, a near-far problem may exist. The near-far problem refers to the situation where a receiving station receives a low-power signal from a desired transmitting station and a high-power signal from a different transmitting station at the same time, resulting in desensitization or "desense" of a receiver in the receiving station to the low-power signal. In other words, the high-power signal may cause the low-power signal to fall below the receiver's detectability threshold. For instance, when the high power transmitting station is located near the receiving station operating in the same timeslot but on a different frequency sub-channel, the high transmit energy can desensitize the receiver.

In a wireless communication system, duplex operation is supported whereby an eNB and a station can both transmit and receive information. With a half-duplex operation, a station cannot transmit and receive information at the same time. With a full duplex operation, a station can transmit and receive information at the same time. Half-duplex operation can be realized with time division duplex (TDD) where a single frequency channel is divided in time with a portion of the time reserved for transmission from an eNB to a station, commonly referred to as the downlink, and a separate orthogonal portion of the time reserved for transmission from a station to an eNB, commonly referred to as the uplink. Full-duplex operation can be realized with frequency division duplex (FDD) where two frequency channels are utilized. One frequency channel is dedicated for downlink transmissions from an eNB to a station while the second simultaneously operating frequency channel is dedicated for uplink transmissions from a station to an eNB. Both the TDD and FDD frequency channels may be divided into timeslots in support of OFDMA.

Scheduling algorithms are widely used in wireless networks for allocating or distributing communication resources (e.g., timeslots and/or sub-channels) among stations to take advantage of instantaneous channel variations by giving priority to the stations with favorable channel conditions. For instance, in an OFDMA communication system, a base station or eNB can include a time-division multiple access (TDMA) scheduler that schedules time/frequency resources used by each uplink communication and each downlink communication. More than one uplink communication may originate from a transmitter of one or more stations whereas the downlink communication originating from the transmitter of a base station or eNB is intended for receiver(s) of one or more stations. The scheduler may assign an uplink communication on different sub-channels within the same timeslot to different stations. In particular, the base station or eNB scheduler may schedule these uplink communications either in different timeslots or in the same timeslot and uses power control to prevent/reduce near-far interference among various stations communicating to the eNB. Accordingly, the TDMA scheduler avoids near-far problems by either creating time-orthogonal uplink transmissions or through uplink power control. The scheduler may assign a downlink communication on different sub-channels within the same timeslot from an eNB to different stations. The near-far interference issue is avoided in that there is only the single desired transmitter and no interfering transmitter operating simultaneously. These techniques are applicable to TDD wireless communication systems where a select orthogonal portion of time has been set aside within the frequency channel for uplink and downlink transmissions and FDD wireless communication systems where a separate frequency channel is dedicated to uplink and downlink transmissions.

Although the TDMA scheduling techniques described above work well in situations where all stations communicate with and are assigned or scheduled resources by a central base station or eNB, these techniques do not work in mixed networks that also include direct station-to-station or "peer-to-peer" communication between stations. When one station connects directly with and communicates directly with another station, this method of communication is referred to herein as peer-to-peer communication. With peer-to-peer communication, there is no concept of uplink and downlink because communications links occur between the stations and do not necessarily involve the eNB. When peer-to-peer communication links are allowed to share a portion of the time-frequency resources whether within conventional uplink or downlink resource allocations or resource allocations occupied by peer-to-peer communication links alone, near-far interference can occur. The near-far interference can desense either the eNB-to-station and station-to-eNB communication links or the peer-to-peer links.

Peer-to-peer communication can be directed by a base station or eNB (centralized scheduling), or it can be self-directed by stations involved in the communication (distributed scheduling). With centralized scheduling, stations communicate with the base station or eNB via control channels to exchange information needed for scheduling. With distributed scheduling stations communicate with each other in order to exchange information needed to schedule resources. Ad-hoc mesh network may expand the communications range of peer-to-peer networks, wherein mesh nodes or stations could collect and forward routing, neighbor list and other information either to a centralized base station/eNB scheduler or to stations employing distributed scheduling. OFDMA communication systems allowing peer-to-peer communications employing either centralized scheduling or distributed scheduling with or without mesh ad-hoc may experience significant near-far interference when conventional TDMA uplink/downlink scheduling is being used Accordingly, it would be desirable to provide scheduling techniques for scheduling peer-to-peer communication links.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
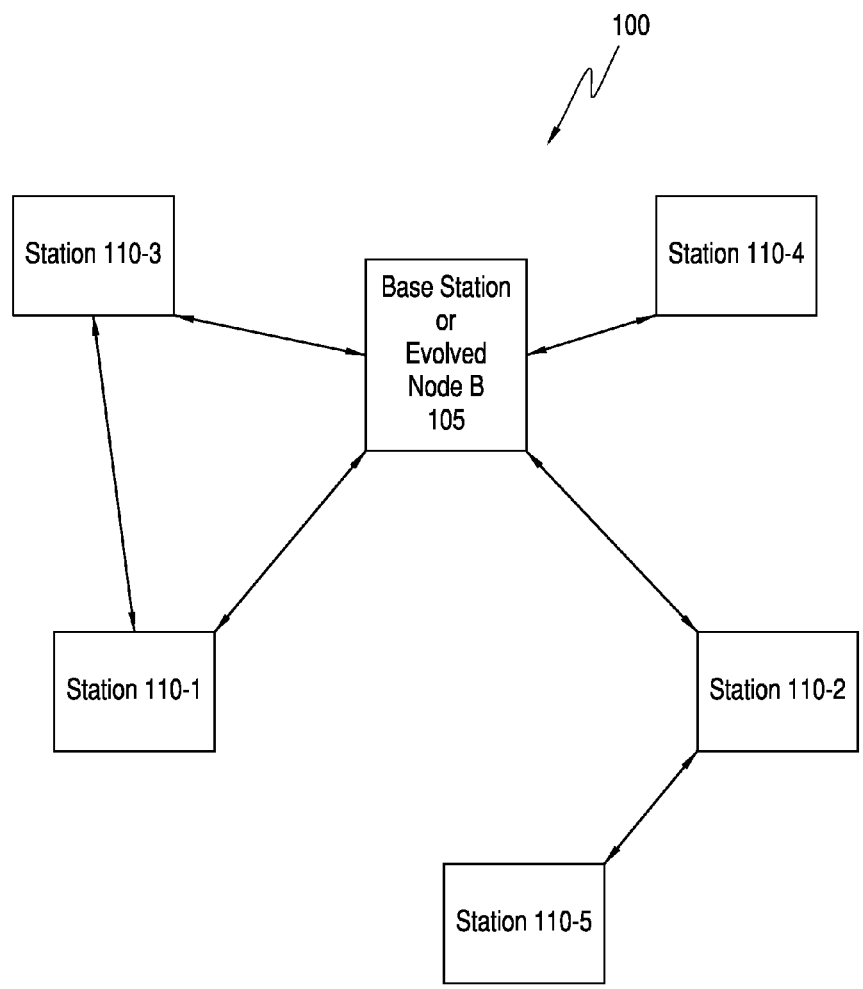
FIG. 1 is a block diagram of a wireless communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for allocating resources for peer-to-peer communications. An evolved Node B identifies resources to designate for peer-to-peer communications. The evolved Node B creates or updates peer sets from measured performance information received from one or more stations. The measured performance information includes at least one quality metric requested with a downlink signal sent from the evolved Node B to the one or more stations. The evolved Node B determines excluded timeslots and preferred timeslots based on current resource assignments in each timeslot and based on the peer sets, marks potential resources in a peer-to-peer designated portion of a resource allocation map, and allocates one of the potential resources for peer-to-peer communication between a transmitter station and one or more receiver stations.

FIG. 1 is a block diagram of a wireless communication network in accordance with some embodiments. Wireless communication network 100 may, for example, be a Long Term Evolution (LTE) network or wireless communication network 100 may be capable of operating in compliance with the IEEE 802.16 standards. Wireless communication network 100 includes subscriber stations, when the network is operating in compliance with the IEEE 802.16 standards, or user equipment, when the network is an LTE network. For the sake of simplicity both the subscriber stations and the user equipment are referred to as stations 110. Wireless communication network 100 also includes at least one base station 105, when the network is operating in accordance with IEEE 802.16 standards, or at least one evolved Node B (eNB) 105, when the network is an LTE network. Stations 110 are wireless communication devices enabled to communicate over, for example, Orthogonal Frequency-Division Multiple Access (OFDMA) communication links in peer-to-peer communications. Stations 110 are also enabled to communicate with base station 105 or eNB 105. In some embodiments, each station 110 is potentially mobile (i.e., not fixed) and can be mobile at any particular time, whereas base station 105 may be fixed at a particular location for a predefined period of time. In some embodiments, base station 105 is also potentially mobile. Base station 105 or eNB 105 can communicate data and/or control signaling information with stations 110. In network 100, station 110-1 and station 110-5 have direct peer-to-peer communication links with stations 110-3 and 110-2, respectively.

To provide greater control over the network, many decisions are made at base station 105 or eNB 105. For example, centralized scheduling algorithms can be implemented within base station 105 or eNB 105 and base station 105 or eNB 105 can be responsible for making resource scheduling decisions for allocating resources to the various stations 110 operating within a cell that is defined by the base station 105 or eNB 105. Base station 105 or eNB 105 schedules uplink resources and downlink resources for its communication with various stations. In addition, base station 105 or eNB 105 also schedules resources for direct, peer-to-peer communication links that are used for communications between stations 110.

Figure 2:
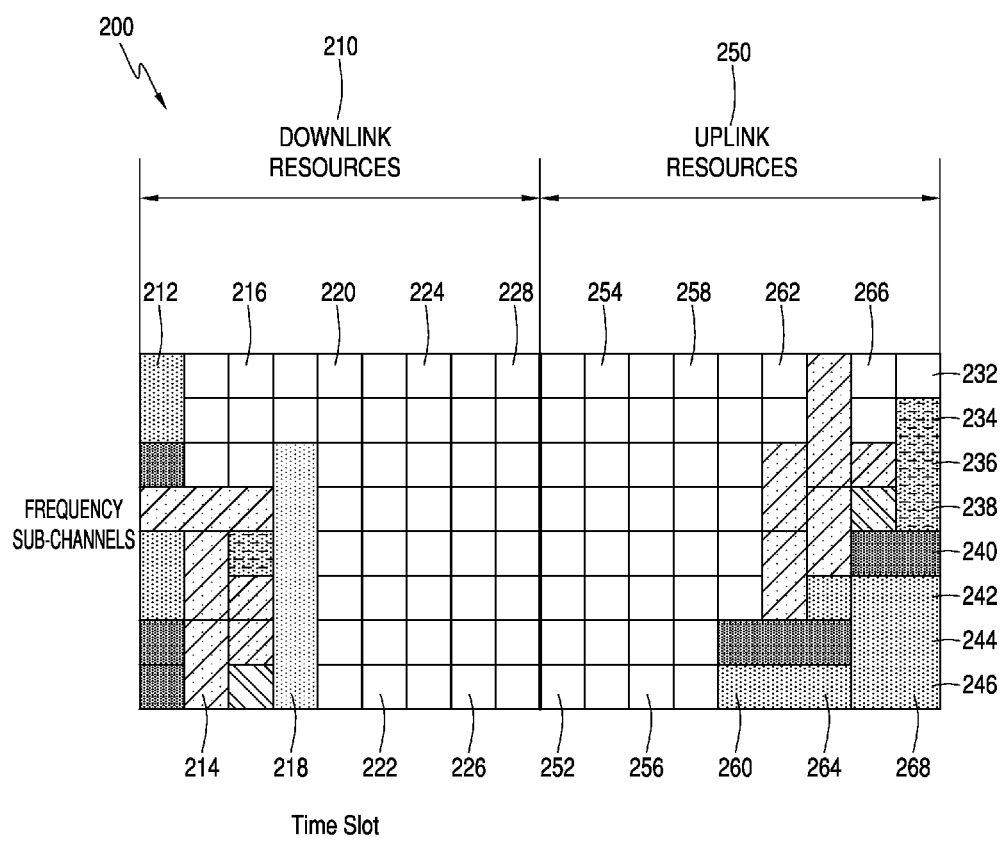
FIG. 2 is a block diagram of resource allocations within a single OFDMA frame in accordance with some embodiments.

FIG. 2 is a block diagram of resource allocations within a single OFDMA frame in accordance with some embodiments. In the OFDMA frame 200, resources may be split into uplink resources in an uplink portion 250 of the frame 200 and downlink resources in a downlink portion 210 of the frame 200. Individual resource allocations within the frame 200 are shown as shaded rectangles. In other words, the shaded rectangles are resources that have been allocated to particular stations. These allocated resources are also maintained by the base station or eNB in a list called a resource allocation map. Time division duplexing (TDD) or frequency division duplexing (FDD) may be implemented such that the uplink and downlink are allocated different (non-overlapping) time-periods of the frame or different (non-overlaping) frequency channels. In a time division duplex (TDD) implementation, the downlink and uplink portions 210, 250 are groups of timeslots that can also be called, for example, uplink and downlink sub-frames or zones. Typically, the size in time of frame 200 is fixed whereas the partition between downlink and uplink portions 210, 250 can be adjusted. The partition between downlink and uplink portions 210, 250 of the frame 200 and resource allocations of the frame 200 are maintained in the resource allocation map located in the base station or eNB's memory in accordance with some embodiments.

In a frequency division duplex (FDD) implementation, two OFDMA frames 200 are allocated and operate simultaneously on different (non-overlapping) frequency channels. The downlink portion 210 of the one OFDMA frame 200 may extend over all timeslots on the one frequency channel while the uplink portion 250 of the second OFDMA frame 200 may extend over all timeslots on the second frequency channel. The assignment of downlink and uplink portions 210, 250 to the two frames 200 and resource allocations of the two frames 200 are maintained in the resource allocation map located in the base station or eNB's memory in accordance with some embodiments. The resource allocation map includes entries for all downlink (DL) resources, all uplink (UL) resources, and all peer-to-peer (P2P) designated resources of the base station or eNB, and also specifies which ones of the DL, UL, and P2P resources are currently allocated to specific stations.

OFDM modulation is implemented for downlink and single carrier frequency division multiple access (SC-FDMA) modulation is implemented for uplink communications within LTE, and a particular frequency channel is divided into multiple OFDMA timeslots. Each timeslot has a number of subcarriers/sub-channels of a wideband channel.

In the resource allocation map, the timeslots correspond to vertical columns 212-228 and 252-268 of frame 200, where the group of timeslots defines an OFDMA frame 200. Subcarriers/sub-channels 232-246 correspond to horizontal rows of the frame 200, where the same subcarriers/sub-channels are used for both uplink and downlink.

Although not illustrated, the resource allocation map could also include specific dedicated "zones." These dedicated zones are portions of frame 200 that are reserved exclusively for or dedicated to direct station-to-station (i.e., "ad hoc" or "peer-to-peer") communication links, or alternatively, for direct station-to-relay station communication links. Thus, in one embodiment, direct station-to-station(s) communication links can be interspersed with normal station-to-base station or eNB uplinks or base station or eNB-to-station downlinks. In another embodiment, a subset or region or zone of timeslots in the downlink portion/zone 210 or the uplink portion/zone 250 of the frame 200 can be dedicated or devoted exclusively to direct station-to-station communication links. In this exclusive region, no station-to-base station or eNB traffic may be allowed or scheduled. In the aggregate, all resources identified for peer-to-peer communication links are referred to herein as peer-to-peer resource allocation or peer-to-peer resources.

Each shaded-rectangle in FIG. 2 represents a frequency subcarrier/sub-channel and timeslot allocation to a particular station for a particular communication link (either with the base station or eNB or with another station). In this example, it is assumed that a diversity subcarrier/sub-channelization scheme is implemented such that different subcarriers/sub-channels within one timeslot can be allocated to different stations and the base station or eNB in any order. Moreover, the subcarriers/sub-channels assigned to a particular station or base station or eNB can vary from timeslot to timeslot (i.e., subcarriers assignments do not need to follow the same pattern in each timeslot).

The peer-to-peer communication links are scheduled in the portion of time frequency resources designated as peer-to-peer resources. These resources can originate from one or more of the portions partitioned for uplink, downlink or dedicated peer-to-peer communication links alone. A given peer-to-peer communication link between a transmitter station and one or more receiver stations can occupy the same frequency channel or an individual peer-to-peer communication links between the transmitter station and one or more receiver stations can occupy different frequency channels simultaneously. Distinct peer-to-peer communication links between one or more transmitter stations and one or more receiver stations can occupy different frequency channels simultaneously when the designated peer-to-peer resources span more than one frequency channel. The modulation transmitted by the transmitter station to the one or more receiver stations must be compatible with any existing time co-incident transmissions particularly when the peer-to-peer resource allocated is taken from an uplink or downlink portion of an OFDMA frame.

Figure 3:
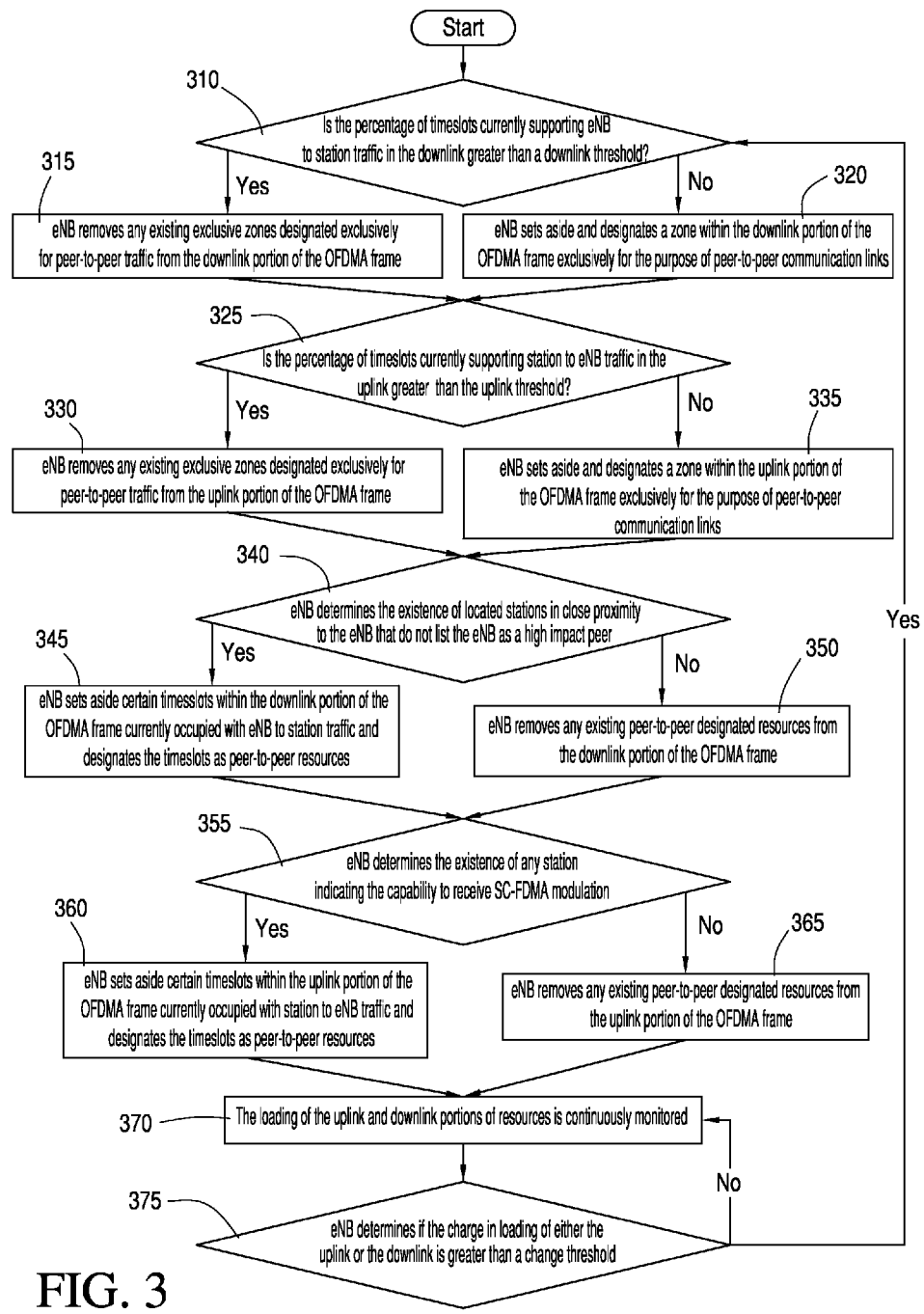
FIG. 3 is a block diagram of a designated peer-to-peer resource allocation determination method with the base station or eNB in accordance with some embodiments.

FIG. 3 is a block diagram of a designated peer-to-peer resource allocation determination method implemented in the base station or eNB in accordance with some embodiments. Portions of timeslots within the uplink and downlink are designated as suitable for peer-to-peer communications. In 310, the percentage of timeslots currently supporting eNB to station traffic in the downlink is compared against a downlink loading threshold. When the percentage of loading is greater than the downlink loading threshold, in 315, the eNB removes any existing exclusive zones designated exclusively for peer-to-peer traffic from the downlink portion of the OFDMA frame. When the percentage of loading is less than the downlink loading threshold, in 320, the eNB sets aside and designates a zone within the downlink portion of the OFDMA frame exclusively for the purpose of peer-to-peer communication links. In 325, the percentage of timeslots currently supporting station to eNB traffic in the uplink is compared against an uplink loading threshold. When the percentage of loading is greater than the uplink loading threshold, in 330, the eNB removes any existing exclusive zones designated exclusively for peer-to-peer traffic from the uplink portion of the OFDMA frame. When the percentage of loading is less than the uplink loading threshold, in 335 the eNB sets aside and designates a zone within the uplink portion of the OFDMA frame exclusively for the purpose of peer-to-peer communication links.

In 340, the existence of any stations located in proximity to the eNB that do not list the eNB as a high impact peer is determined. When any such stations exist, in 345 certain timeslots within the downlink portion of the OFDMA frame currently occupied with eNB to station traffic are set aside and designated as a peer-to-peer resource. When no such stations exist, in 350, any existing peer-to-peer designated resources are removed from the downlink portion of the OFDMA frame. In 355, the existence of any station indicating the capability to receive SC-FDMA modulation is determined. In any such stations exist, in 360, certain timeslots within the uplink portion of the OFDMA frame currently occupied with station to eNB traffic are set aside and designated as peer-to-peer resources. When no such stations indicate the capability of receiving SC-FDMA modulation, in 365, any existing peer-to-peer designated resources are removed from the uplink portion of the OFDMA frame. In 370, the loading of the uplink and downlink portions of resources is continuously monitored. In 375, when the change in loading of either the uplink or the downlink is greater than a change threshold, return to 310 to determine again the resources to designate as peer-to-peer resources. When the traffic has not changed by greater than the threshold, return to 370 where the monitoring continues.

The modulation transmitted by the transmitter station to the one or more receiver stations must be compatible with any existing time coincident transmissions particularly when the peer-to-peer resource allocated is taken from an uplink or downlink portion of an OFDMA frame not exclusive to peer-to-peer links. The modulation does not need to be compatible with the uplink SC-FDMA or downlink OFDM modulation when using a dedicated peer-to-peer communication resource allocation. A dedicated peer-to-peer resource allocation does not contain any time coincident uplink or downlink communications.

Wireless access network (WAN) LTE links use OFDM modulation for the downlink and SC-FDMA modulation for the uplink. SC-FDMA has a smaller peak to average than OFDM and therefore results in a smaller power amplifier and lower current drain for the transmitter station. However, SC-FDMA requires more processing at the receiver station. Therefore, by using OFDM on the downlink the receiver station has less complexity and lower current drain. Interference issues occur when OFDM and SC-FDMA occur in the same timeslot for a given uplink or downlink, so peer-to-peer links must match the standard air interface of LTE WAN when operating in peer-to-peer resource allocation time coincident with an uplink or downlink communication link.

Figure 4A:
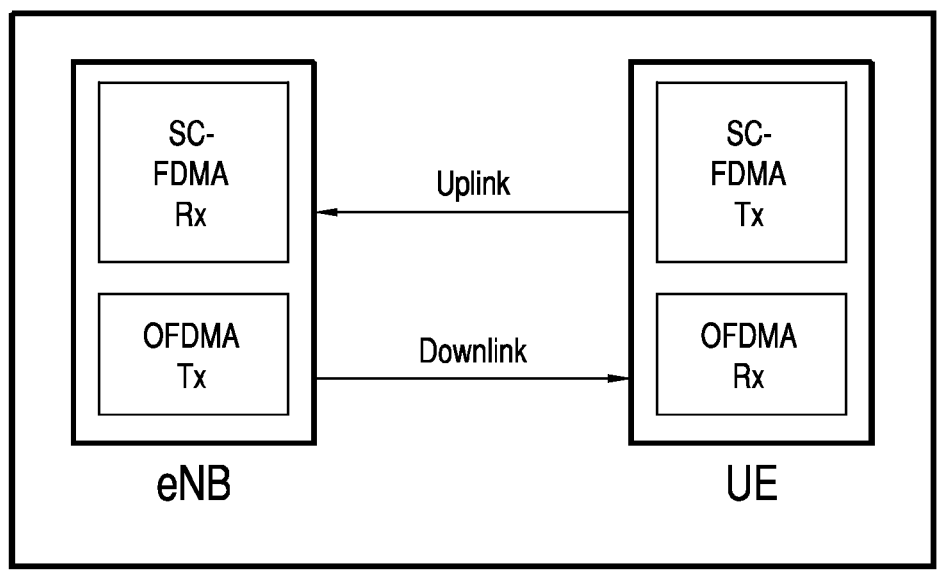
FIG. 4A is a block diagram of a standard air interface.
Figure 4B:
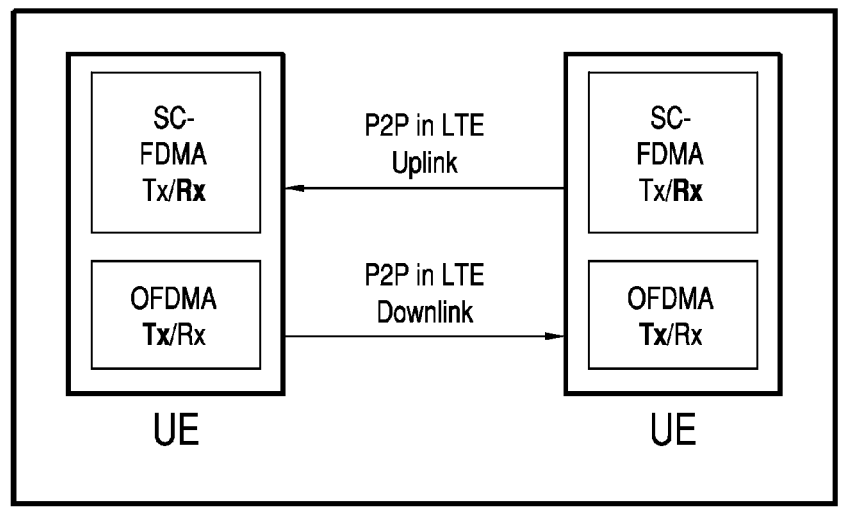
FIG. 4B is a block diagram of an air interface for implementation of Long Term Evolution (LTE) peer-to-peer communication in the uplink or downlink in accordance with some embodiments.
Figure 4C:
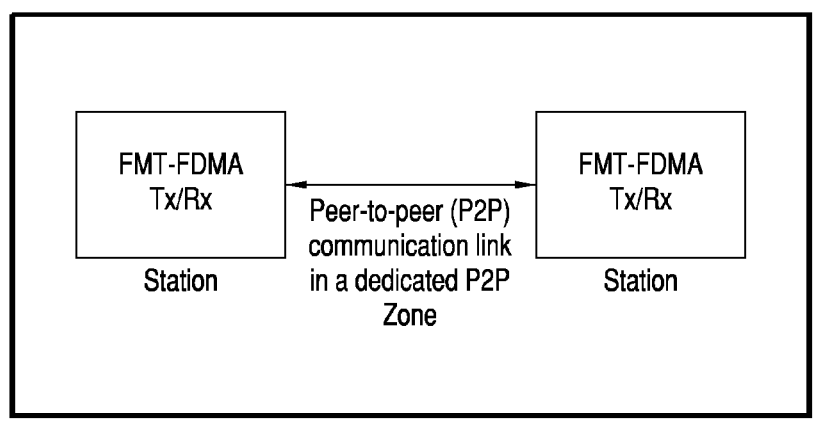
FIG. 4C is a block diagram of an air interface for implementation of Long Term Evolution (LTE) peer-to-peer communication in the dedicated peer-to-peer zone in accordance with some embodiments.

FIG. 4a is a block diagram of a standard air interface of LTE WAN. FIG. 4b is a block diagram of an air interface for implementation of LTE peer-to-peer communication in the uplink or downlink in accordance with some embodiments. For uplink peer-to-peer communication, as shown in FIG. 4B, each station includes at least one SC-FDMA receiver in addition to a currently used transmitter, as shown in FIG. 4A. For downlink peer-to-peer communication, as shown in FIG. 4B, each station includes at least one OFDM transmitter in addition to a currently used receiver, as shown in FIG. 4A. Accordingly, for both uplink and downlink peer-to-peer communication, each station includes both a SC-FDMA receiver and an OFDM transmitter in addition to the standard UE transmitter and receiver shown in FIG. 4A. For peer-to-peer communication on a peer-to-peer exclusive resource allocation not time coincident with other uplink or downlink communications, a modulation different from either the downlink and uplink modulation can be utilized. In some embodiments, this modulation is filtered multi-tone frequency division multiple access FMT-FDMA modulation, shown for example in FIG. 4C. Accordingly, for both uplink and downlink peer-to-peer communication, each station includes a FMT-FDMA receiver and transmitter, as shown in FIG. 4C.

Peer stations associated with, for example high receive signal strength (RSS), can cause the most interference for nearby receiver stations in the same time slot. Therefore it is desirable to schedule transmissions of high RSS peers in different time domain resources than those scheduled for receive by high RSS peer neighbors. In some embodiments, the base station or eNB schedules peer-to-peer resources for peer-to-peer communication links using broadcast information elements (IEs) and unicast response messages (RMs). The information elements include a resource map information element (RMIE) and a grant metric information element (GMIE), discussed in more detail below.

The base station or eNB may proactively allocate peer-to-peer resources by instructing stations on how to collect appropriate information. The stations collect and measure the information requested by the base station or eNB and send the collected information to the base station or eNB. The base station or eNB uses the information sent from the stations to create and update peer-sets of the stations and to schedule inter-peer resources and/or intra-peer resources.

Figure 5:
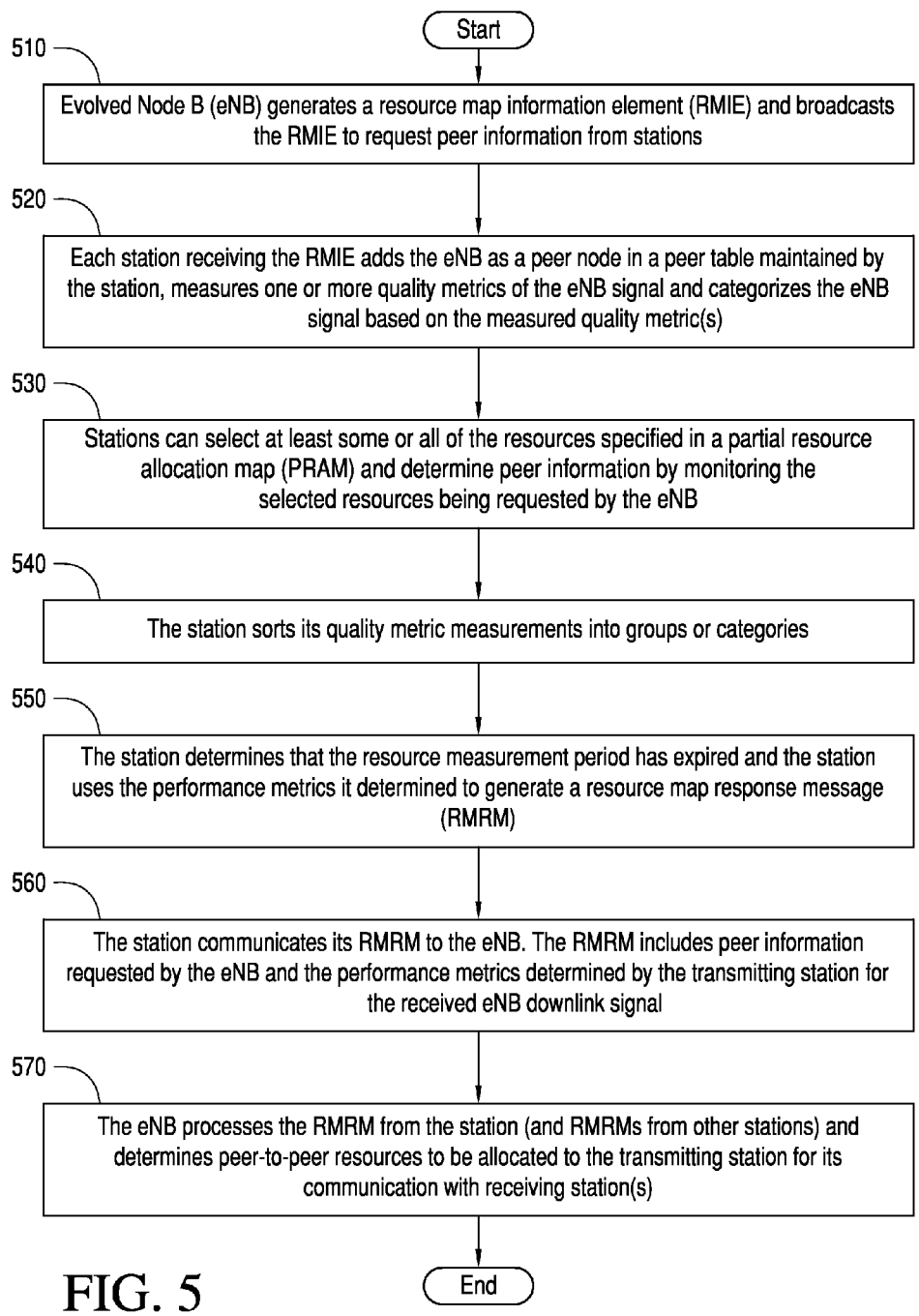
FIG. 5 is a flow diagram of a proactive resource allocation method between peer stations and an evolved node B (eNB) in accordance with some embodiments.

FIG. 5 is a flow diagram of a proactive resource allocation method between peer stations and an eNB in accordance with some embodiments. In 510, the eNB generates a resource map information element (RMIE) and broadcasts the RMIE to request peer information from stations. The stations may include one or more transmitter stations that want to request a resource allocation grant from the eNB to transmit to one or more peer stations. In one implementation, the RMIE includes information that informs the stations about how many and what types of measurements to take for specified performance metrics. The eNB may periodically broadcast the RMIE. The RMIE implicitly indicates that peer-to-peer traffic is allowed by the eNB due to the fact that the RMIE is transmitted. The RMIE includes partial resource allocation maps (PRAMs), wherein a PRAM is communicated from the eNB so that each station knows which resources in a resource allocation map to monitor and so that the station does not have to monitor the entire set of resources. Resources specified in a PRAM can be presently free or presently allocated. In other words, each PRAM specifies resources that the base station or eNB wants more information about.

In 520, each station receiving the RMIE adds the eNB as a peer node in a peer table maintained by the station. The station also measures one or more quality metrics, such as Receive Signal Strength (RSS), of the eNB signal and categorizes the eNB signal based on the measured quality metric(s). The eNB signal may be categorized as high, medium, or low impact. In 530, stations, including the transmitter station seeking peerto-peer resource allocation grants from the eNB, can select at least some or all of these resources in the PRAM and determine (measure or calculate) peer information by monitoring the selected resources being requested by the eNB based on the information specified in the RMIE/PRAM. Thus, upon receiving the RMIE, the station measures a particular radio frequency (RF) quality metric described in the RMIE for selected ones of the timeslots specified in the RMIE. The RF quality metrics may be, for example, Receive Signal Strength (RSS), Signal-to-Noise (SNR) and/or Signal-to-Interference-Plus-Noise (SINR) power levels.

In some embodiments, the transmitter station sets the resource measurement variables, starts a timer that specifies a resource measurement period, and begins to monitor an OFDMA channel for selected peer-to-peer resources as specified in the RMIE/PRAM received from the eNB. The resource measurement period is set such that the transmitter station will receive one or more OFDMA frames transmitted on the OFDMA channel. The resource measurement period can be a standard value that is known to the transmitter station that is of duration that is long enough to allow accurate measurements. This duration can vary depending upon the implementation. In one embodiment the resource measurement period is selected during system installation and downloaded to all stations.

In some embodiments, the transmitter station monitors the OFDMA channel until it receives a new OFDMA frame from the eNB. The OFDMA frame includes a preamble which defines when the OFDMA frame starts. Upon receiving the next OFDMA frame, the station may begin determining (e.g., measuring and/or calculating) performance metrics for "selected" peer-to-peer resources specified in the RMIE/PRAM received from the eNB. The station may not need to determine (e.g., measure and/or calculate) performance metrics for all peer-to-peer resources specified in the RMIE/PRAM, but can in some implementations. In some embodiments, the stations are permitted to select particular ones of the peer-to-peer resources specified in the RMIE/PRAM. For example, in one embodiment, the transmitter station can select particular ones of the peer-to-peer resources specified in the RMIE/PRAM and monitor those selected peer-to-peer resources to determine performance metrics (e.g., RSS) associated with the selected peer-to-peer resources. In such embodiments, the portion of the RMIE/PRAM that is monitored is left up to the station. In one specific implementation, the station can randomly select peer-to-peer resources from the PRAM or randomly select groups of peer-to-peer resources from the PRAM.

In 540, the station sorts its quality metric measurements into groups or categories (for example, high, medium, low, etc). For example, according to one implementation, the transmitter station may categorize the measured RSS levels into high, middle and low measured RSS levels.

In 550, the transmitter station determines whether the resource measurement period has expired. When the resource measurement period has expired, the transmitter station uses the performance metrics it determined (measured or calculated) to generate a resource map response message (RMRM). The RMRM includes a partial peer-to-peer resource measurement map (PRMM) for the peer-to-peer resources specified in the PRAM. The PRMM, therefore, includes performance metrics determined by the transmitter station for the selected peer-to-peer resources. The RMRM also includes the performance metrics determined by the transmitter station for the received eNB downlink signal.

In 560, the transmitter station communicates its RMRM to the eNB. The RMRM includes peer information requested by the eNB in the RMIE as determined by the transmitter station and the performance metrics determined by the transmitter station for the received eNB downlink signal. Other stations may also transmit their respective RMRMs back to the eNB. In some embodiments, at a minimum, any transmitter station that is preparing to request a peer-to-peer resource allocation needs to send its RMRM, and at a maximum, every station receiving the RMIE sends its RMRM to the eNB.

The transmitter station also transmits a resource request message (RRM) to the eNB to request resources for a communication session or "call" with one or more receiver station(s). The RRM indicates the type of communication session the transmitter station would like to set up with one or more receiver station (s), including information regarding quality of service (QoS) requirements for the communication session. The RRM can also include information regarding the station type and/or information about the size of the packet to be transmitted by the transmitter/source station. In one embodiment, the RRM includes the RMRM (and hence the PRMM). In another embodiment, the transmitter station transmits the RMRM separately.

In 570, the eNB processes the RMRM from the transmitter station (and RMRMs from other station(s)) and determines peer-to-peer resources to be allocated to the transmitter station for its communication with the receiver station (s). Thus, the eNB can use the PRMM from the transmitter (along with PRMMs from other station(s)) to help make peer-to-peer resource allocation decisions. The eNB saves the received RMRM and the initial peer-to-peer RRM from the transmitter station in its memory. The eNB can determine the amount of resources to be allocated, based on the RMM. For example, the eNB may use the information in the RMM to determine the packet size that the transmitter station is requesting to transmit and/or the station type of the transmitter station.

The eNB uses the information in stations' RMRMs when applying rules for scheduling or allocating peer-to-peer resources to avoid causing near-far issues. The peer-to-peer resources allocated to the transmitter station are allocated such that stations communicating over different sub-channels of the same timeslot(s) will not cause near-far problems for other stations, including the transmitter station, and likewise communications by the transmitter station over the peer-to-peer resources it has been allocated will not cause near-far problems for other stations. The proactive scheduling methods can accommodate large changes over time in the amount of peer-to-peer traffic by dynamically adjusting the content of the RMIE and RMRM.

Based on the PRMM from the RMRM, the eNB updates peer information for the transmitter station that is requesting the peer-to-peer resource grant. At this point in time, only information that the transmitter station has sent in the recent RMRM is used to update the transmitter station's peer information. However, other stations that receive transmissions from the transmitter station may send back the transmitter station's resource allocation in their RMRM. Some embodiments may assume that wireless channels are reciprocal and update the transmitter station's peer information to include stations whose RMRMs contain the transmitter station. The eNB extracts measured quality metrics information for the eNB signal sent to the station and the measured quality metrics information for each peer station from the PRMM that was received from the transmitter station to create an entry in a peer memory map (PMM) for the transmitter station.

Peer stations associated with, for example, high receive signal strength (RSS), can cause the most interference for nearby receiver stations in the same time slot. Therefore it is desirable to schedule transmissions of high RSS peers in different time domain resources than those scheduled for receive by high RSS peer neighbors. When the eNB receives PRMMs from each station that want to transmit peer-to-peer traffic, the eNB combines the information from multiple PRMMs received from different stations to create or update peer sets.

For example, the eNB processes the PRMM provided by the transmitter station along with other PRMMs from other stations to generate or update "high impact peer sets" of stations that have a high probability of causing near-far issues to each other and "low impact peer sets" that have a low probability of causing near-far issues to each other. As used herein, the term "high impact peer set" refers to information that identifies groups of stations that could potentially cause near-far issues when one station that belongs to the peer set transmits while another station that belongs to the peer set is attempting to receive a different transmission from another station that does not belong to the peer set. As used herein, the term "low impact peer set" refers to information that identifies groups of stations that are unlikely to cause near-far issues when one station that belongs to the peer set transmits while another station that belongs to the peer set is attempting to receive a different transmission from another station that does not belong to the peer set. It should be noted that interference within a timeslot may be additive such that two or more medium impact peers can cause high impact.

In an FDD implementation where peer-to-peer resources originate from both the LTE WAN downlink and uplink frequency channels, the peer sets can be improved by using the station's SC-FDMA reciever (shown in FIG. 4B) to listen to non-peer-to-peer uplink traffic and collect information on peers. Some of the peer set information normally collected could be collected on normal uplink traffic, including identification numbers and the received signal strength indicator (RSSI). The collected information could be used to populate peer set tables.

After peer sets are updated, the eNb determines which timeslots are excluded (TSx) and preferred (TSp) based on the current station resource assignments in each timeslot, the transmitter station's peer sets in the eNB PMM and the receiver stations' peer sets in the eNB PMM. The eNB then marks potential timeslots as preferred or excluded in a peer-to-peer portion of the resource allocation map maintained at the eNB.

In some embodiments, to minimize the impact of peer-to-peer links to the normal eNB downlink scheduling, peer-to-peer links where both stations are low impact peers to the eNB (not in eNB proximity) and are medium or high impact peers of each other (the peer-to-peer transmitter and receiver stations are in proximity) may be preferred links. All other peer-to-peer links would be scheduled in the uplink OFDMA resources or dedicated peer-to-peer zones. For example, when station 1 and station 2 are high impact peers of each other and when station 1 and station 2 are low impact peers of eNB, the eNB to station 2 downlink can occur in the same timeslot as station 1 and station 2 peer-to-peer communications. Those skilled in the art will recognize that since stations 1 and 2 are in proximity to each other, they can use lower transmit power levels in order to avoid creating unnecessarily large coverage holes for the wide area communications between the eNB and other stations that may be in the vicinity of the peer-to-peer link.

In some scenarios, after a communication session or call is in progress, the peer-to-peer resource allocations provided via the proactive scheduling method can become inadequate and near-far issues can occur for the receiver station. In such cases, the receiver station may request a new peer-to-peer resource allocation (or "re-allocation") to reduce and/or eliminate such near-far issues.

Figure 6:
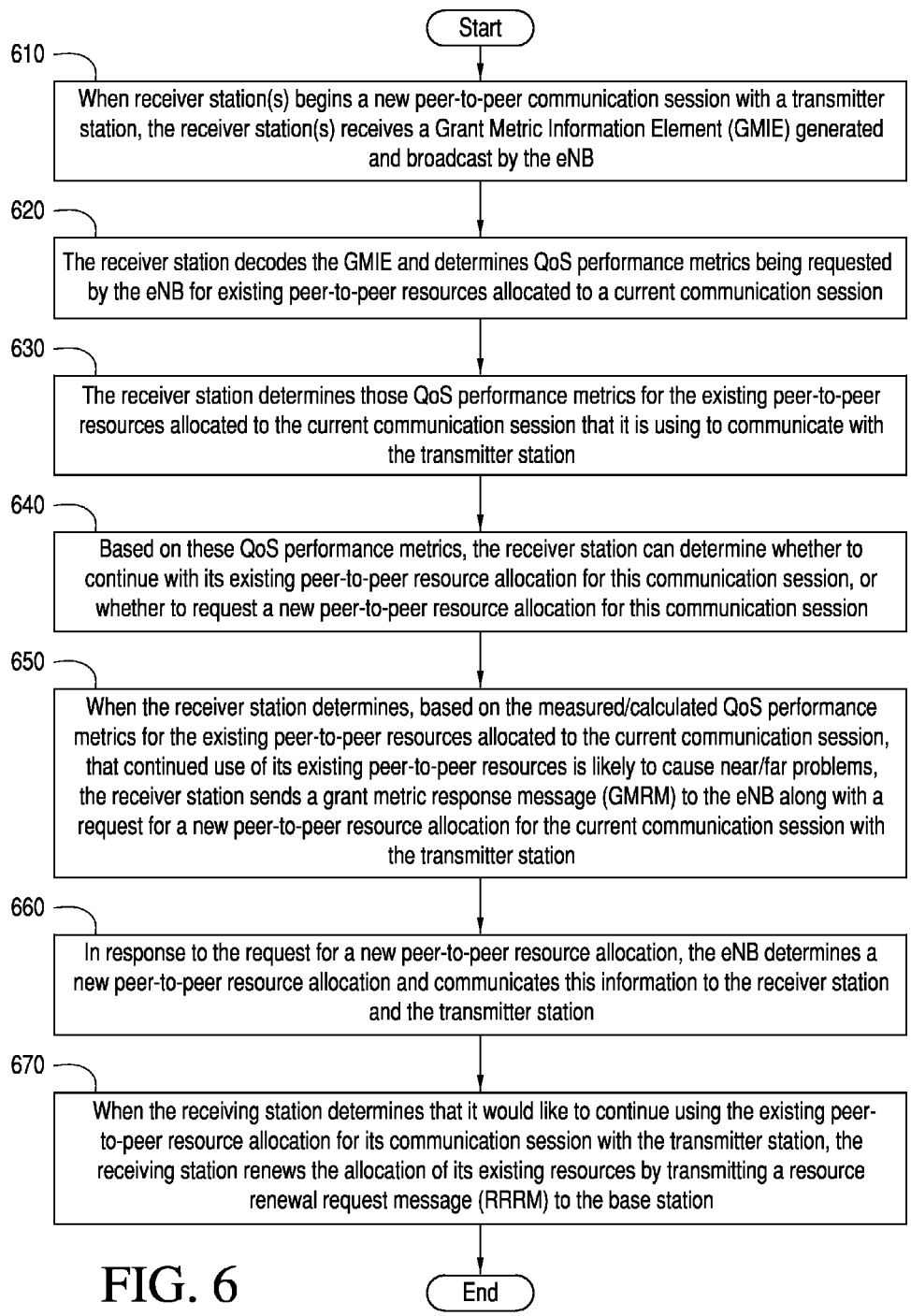
FIG. 6 is a flow diagram of a reactive resource allocation method between peer stations and the evolved node B (eNB) in accordance with some embodiments.

FIG. 6 is a flow diagram of a reactive scheduling method used in accordance with some embodiments. Reactive scheduling methods allow for potential re-allocation of long-term peer-to-peer resources based on QoS performance metrics and allow the receiver station to recover from scenarios in which the proactive scheduling methods fail for some reason (e.g., station mobility or poor RSS measurements). The reactive approach uses feedback from metrics provided by the receiver station at the time of the resource request to improve scheduled resource allocations. In some embodiments, using the reactive approach, the eNB re-schedules peer-to-peer communication resources and, in some embodiments, changes the amount of information the stations collect. For instance, in one implementation, a resource grant is terminated, renewed or reallocated at regular intervals (e.g., approximately every 2 seconds). When the transmitter station is involved in a current communication session or call with the receiver station using resources granted or allocated to it by the eNB as part of a proactive scheduling method, these currently granted resources being used in the active communication session will be referred to below as "existing" resources.

In 610, when the receiver station(s) begins a new peer-to-peer communication session with the transmitter station, the receiver station(s) receives a Grant Metric Information Element (GMIE) generated and broadcast by the eNB. In one implementation, the GMIE can be broadcast by the eNB in a beacon message. The GMIE is used to inform destination/receiver stations of measurements that must be provided by the destination/receiver stations when it is requesting a change in its current resource allocation. The information requested covers the timeslots for a current grant and the requested information is eventually used by the eNB to improve peer groupings and to assess whether a resource re-allocation is warranted. In some embodiments, the GMIE informs stations of the type and amount of QoS information the receiver stations are to provide to the eNB via a Grant Metric Response Message (GMRM).

In 620, the receiver station decodes the GMIE, determines QoS performance metrics (e.g., frame error rate (FER), signal-to-interference-plus-noise ratio (SINR)) being requested by the eNB for existing peer-to-peer resources allocated to the current communication session. In 630, the receiver station determines (measures and/or calculates) those QoS performance metrics for the existing peer-to-peer resources allocated to the current communication session that it is using to communicate with the transmitter station.

Based on these QoS performance metrics, in 640, the receiver station can determine whether to continue with its existing peer-to-peer resource allocation for this communication session, or whether to request a new peer-to-peer resource allocation for this communication session. Prior to sending a request for a new resource allocation, the receiver station measures metrics, such as, the frame error rate (FER) or signal-to-interference-plus-noise ratio (SINR) for the current grant and also measures RSS over a portion of the resource map as was done for the proactive approach. In 650, when the receiver station determines, based on the measured/calculated QoS performance metrics for the existing peer-to-peer resources allocated to the current communication session, that continued use of its existing peer-to-peer resources is likely to cause near/far problems, the receiver station sends a grant metric response message (GMRM) to the eNB along with a request for a new peer-to-peer resource allocation for the current communication session with the transmitter station. Both a grant metric response message and the resource map response message are included as part of the re-allocation request that the receiver station sends to the eNB.

In 660, in response to the request for a new peer-to-peer resource allocation, the eNB determines a new peer-to-peer resource allocation and communicates this information to the receiver station and the transmitter station. The eNB schedules the re-allocation grant and informs the receiver station of the new allocation. The eNB also decides when timeslot allocations need defragmenting because of incompatible sets of peers. The eNB causes the resource allocations for these sets to expire at the same time and informs the stations involved in the current communication session that their resource allocations will be changing. The eNB adjusts the beacon resource map information element and the grant metric information element to request an increase or decrease in receiver station measurements based on the eNB perception of how well the scheduler is delivering error free communications. For example, the eNB would consider the FER rate, the amount of peer to peer traffic, the rate the traffic mix changes from peer-to-peer to eNB-station, the cell load, and the desired ability to handle mobility in setting the resource map information element. Compared to, for example, a threshold, for low loading and/or little peer-to-peer traffic, little additional resource map and metric information is needed. For high loading and/or high peer-to-peer traffic, the resource map and grant metric information elements will request more station information. For the reactive scheduler, the base station may also use the resource map information element or grant metric information as a unicast probe request to a specific station to ask for more detailed resource map information than is required by the beacon information elements.

In 670, by contrast, when the receiver station determines that it would like to continue using the existing peer-to-peer resource allocation for its communication session with the transmitter station, the receiver station renews the allocation of its existing resources by transmitting a resource renewal request message (RRRM) to the eNB.

In one non-limiting implementation, the RMIE and GMIE are transported over-the-air (OTA) from an eNB using a beacon signal; however, it will be appreciated by those skilled in the art that the RMIE and GMIE can be transported using a wide variety of other communication mechanisms or messages. Other potential information sources that could be used to carry information included in the RMIE and GMIE include routing messages, active and passive probe messages, hello messages and channel estimation measurements. Thus, any station that is in a communication session and would potentially require a new resource allocation, upon receiving the GMIE, measures quality of service (QoS) metrics described by the GMIE for each timeslot that it has been allocated. For example, when a receiver station is receiving in timeslots 3 and 4, then it would measure QoS metrics during the communication session on timeslots 3 and 4. The station then reports these QoS metrics in the GMRM.

As traffic changes from eNB-to-station and/or peer-to-peer, the eNB can adjust the RMIE and/or GMIE to adjust the amount of information collected by the stations and sent to the eNB for creation of the peer sets needed to prevent near-far scheduling issues. The eNB also adjusts the RMIE and the GMIE to request an increase or decrease in the receiver station measurements based on the eNB perception of how error free the communication session is. For low loading and/or little peer-to-peer traffic, little additional uplink resource information is needed. Only a small amount of RSS resource information and QoS metrics are required from the receiver stations. When this is insufficient for the eNB to determine how traffic is changing from eNB-to-station and/or peer-to-peer it can put in a temporary request for additional information from a specific receiver station. In one implementation, when the eNB has particular station that it has trouble scheduling, the eNB can unicast an RMIE to this station that requires different measurements than the standard broadcast RMIE. Using unicast requests for additional information via the RMIE and GMIE can provide the information needed by a eNB to improve peer group sets without significant network overhead.

Figure 7:
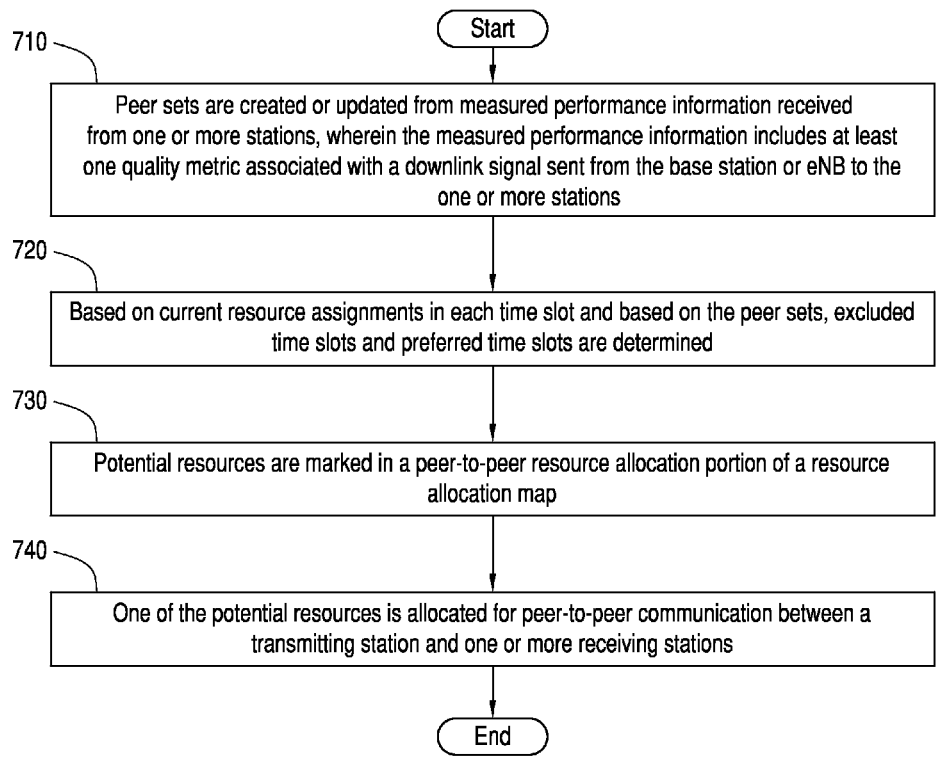
FIG. 7 is a flow diagram of a method for allocating resources for peer-to-peer communications in accordance with some embodiments.

FIG. 7 is a flow diagram of a method for allocating resources for peer-to-peer communications in accordance with some embodiments. In 710, peer sets are created or updated from measured performance information received from one or more stations. The measured performance information includes at least one quality metric associated with a downlink signal sent from the base station or eNB to the one or more stations. In 720, based on current resource assignments in each timeslot and based on the peer sets, excluded timeslots and preferred timeslots are determined. In 730, potential resources are marked in a peer-to-peer resource allocation portion of a resource allocation map. In 740, one of the potential resources is allocated for peer-to-peer communication between a transmitter station and one or more receiver stations.

Figure 8:
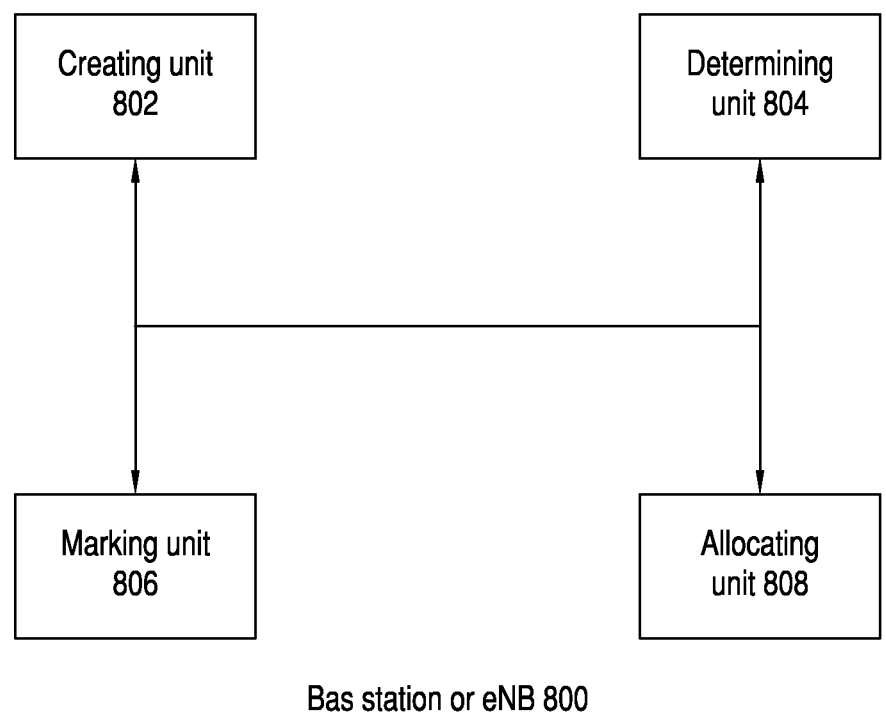
FIG. 8 is a block diagram of a station configured to allocate resources for peer-to-peer communications in accordance with some embodiments.

FIG. 8 is a block diagram of a base station or eNB configured to allocate resources for peer-to-peer communications in accordance with some embodiments. Base station or eNB 800 includes a creating unit 802, a determining unit 804, a marking unit 806 and an allocating unit 808. Creating unit 802 is configured to create or update peer sets from measured performance information received from one or more stations. The measured performance information includes at least one quality metric associated with a downlink signal sent from the base station or eNB to the one or more stations. Determining unit 804 is configured to determine excluded timeslots and preferred timeslots based on current resource assignments in each timeslot and based on the peer sets. Marking unit 806 is configured to mark potential resources in a peer-to-peer resource allocation portion of a resource allocation map. Allocating unit 808 is configured to allocate one of the potential resources for peer-to-peer communication between a transmitter station and one or more receiver stations.

Base station or eNB 800, for example, can be an integrated unit containing at least all the elements depicted in FIG. 8, as well as any other elements necessary for base station or eNB to perform its particular functions. Alternatively, base station or eNB 800 can include a collection of appropriately interconnected units or devices, wherein such units or devices perform functions that are equivalent to the functions performed by the elements of the base station or eNB 800. In some embodiments, base station or eNB 800 may include a random access memory and a programmable memory that are coupled to a processor. The processor may include ports for coupling to wireless network interfaces. The wireless network interfaces can be used to enable base station or eNB 800 to communicate with other stations in an ad hoc wireless network or mesh network. The programmable memory can store operating code (OC) for the processor and code for performing functions associated with base station or eNB 800. For example, the programmable memory can include computer readable program code components configured to cause execution of a method for allocating resources for peer-to-peer communications as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a network node for allocating resources for peer-to-peer communications, the method comprising:
creating or updating peer sets, in the network node, from measured performance information received from one or more stations, wherein the measured performance information includes at least one quality metric associated with a downlink signal sent from the network node to the one or more stations;
determining, based on the measured performance information, whether the network node is a high impact peer of a low impact peer of a peer-to-peer communication transmit station;
determining, in the network node, a preferred timeslot for both a peer-to-peer communication among medium or high impact peer stations and a downlink communication by the network node based on current resource assignments in each timeslot, the peer sets, and the determination of whether the network node is a high impact peer or a low impact peer of each station associated with the peer-to-peer communication;
marking, in the network node, potential resources in a peer-to-peer portion of a resource allocation map based on the determination of the preferred timeslot; and
allocating, in the network node, one of the potential resources for peer-to-peer communication between a transmitter station and one or more receiver stations.

2. The method of claim 1, wherein peer-to-peer communication links between the transmitter station and the one or more receiver stations are on a same frequency channel, unique peer-to-peer communication links between the transmitter station and the one or more receiver stations are on different frequency channels simultaneously or distinct peer-to-peer communication links between one or more transmitter stations and the one or more receiver stations occupy different frequency channels simultaneously when the designated peer-to-peer resources span more than one frequency channel.

3. The method of claim 1, wherein the allocating comprises designating portions of uplink and downlink timeslots in a frame for peer-to-peer communication, wherein when a percentage of timeslots used for downlink communication is greater than a downlink loading threshold, any existing zone designated exclusively for peer-to-peer traffic is removed from a downlink portion of the frame and when the percentage of timeslots used for downlink communication is less than the downlink loading threshold, a zone within the downlink portion of the frame is set aside exclusively for peer-to-peer communication; and wherein when a percentage of timeslots used for uplink communication is greater than a uplink loading threshold, any existing zone designated exclusively for peer-to-peer traffic is removed from a uplink portion of the frame and when the percentage of timeslots used for uplink communication is less than the uplink loading threshold, a zone within the uplink portion of the frame is set aside exclusively for peer-to-peer communication.

4. The method of claim 3, wherein the allocating further comprises determining that one or more stations that are medium or high impact peers of each other do not list the node as a high impact peer and designating timeslots in a downlink portion of the frame as a peer-to-peer resource or removing peer-to-peer designated resources from the downlink portion of the frame when there are no stations in proximity to each other that do not list the node as a high impact peer.

5. The method of claim 4, wherein the allocating further comprises determining that one or more stations is capable of receiving a predefined modulation and designating a portion of timeslot with the uplink portion of the frame as a peer-to-peer resource or removing a resource designated as a peer-to-peer resource from the uplink portion of the frame when no station is capable of receiving the predefined modulation.

6. The method of claim 1, wherein a modulation transmitted by the transmitter station to the one or more receiver stations is compatible with an existing time coincident transmission when an allocated peer-to-peer resource is taken from a uplink portion or a downlink portion of a frame, wherein the uplink portion or the downlink portion is not exclusive to peer-to-peer communication links or wherein the modulation transmitted by the transmitter station to the one or more receiver stations is a predefined modulation that is different from an uplink modulation or a downlink modulation, wherein the uplink portion or the downlink portion is exclusive to peer-to-peer communication links.

7. The method of claim 1, where potential resources in the peer-to-peer portion of the resource allocation map originate from at least one portion of a frame partitioned for uplink, downlink or dedicated peer-to-peer communication links.

8. The method of claim 1, wherein the allocating comprises allowing downlink peer-to-peer transmission to compete with transmissions from the node to the one or more stations or allowing uplink peer-to-peer transmission to compete with transmissions from the one or more stations to the node.

9. The method of claim 1, wherein the determining comprises selecting a preferred peer link as a link where both the transmitter station and a receiver station are low impact peers of the node and are medium or high impact peers of each other and wherein a downlink transmission from the node to the transmitter station or the receiver station can occur in the same timeslot as peer-to-peer communication between the transmitter station and the receiver station.

10. The method of claim 1, wherein the allocating comprises reallocating resources when one or more selected communication links between the transmitter station and the one or more receiver stations are insufficient to maintain communications between the transmitter station and the one or more receiver stations.

11. The method of claim 1, wherein the peer sets are groups as one of high impact, middle impact, or low impact, wherein a high impact peer set has a high probability of having a near-far problem, a medium impact peer set has a medium probability of having the near-far problem and a low impact peer set has a low probability of having the near far problem.

12. The method of claim 1, wherein the creating comprises:

generating a resource information element to obtain measurements for specified performance metrics from a station;

receiving a resource map response message from the station with the specified performance metrics; and processing the resource map response message to determine peer-to-peer resources to be allocated to the station.

13. A node configured to allocate resources for peer-to-peer communications, the node comprising:

a creating unit configured to create or update peer sets from measured performance information received from one or more stations, wherein the measured performance information includes at least one quality metric associated with a downlink signal sent from a node to the one or more stations;

a determining unit configured to determine, based on the measured performance information, whether the network node is a high impact peer of a low impact peer of a peer-to-peer communication transmit station and determine a preferred timeslot for both a peer-to-peer communication among medium or high impact peer stations and a downlink communication by the network node based on current resource assignments in each timeslot, the peer sets, and the determination of whether the network node is a high impact peer or a low impact peer of each station associated with the peer-to-peer communication;

a marking unit configured to mark potential resources in a peer-to-peer portion of a resource allocation map based on the determination of the preferred timeslot; and an allocating unit configured to allocate one of the potential resources for peer-to-peer communication between a transmitter station and one or more receiver stations.

14. The node of claim 13, wherein the allocating unit is configured to designate portions of uplink and downlink timeslots in a frame for peer-to-peer communication, wherein when a percentage of timeslots used for downlink communication is greater than a downlink loading threshold, any existing zone designated exclusively for peer-to-peer traffic is removed from a downlink portion of the frame and when the percentage of timeslots used for downlink communication is less than the downlink loading threshold, a zone within the downlink portion of the frame is set aside exclusively for peer-to-peer communication; and wherein when a percentage of timeslots used for uplink communication is greater than a uplink loading threshold, any existing zone designated exclusively for peer-to-peer traffic is removed from a uplink portion of the frame and when the percentage of timeslots used for uplink communication is less than the uplink loading threshold, a zone within the uplink portion of the frame is set aside exclusively for peer-to-peer communication.

15. The node of claim 14, wherein the allocating unit is configured to determine that one or more stations that are medium or high impact peers of each other do not list the node as a high impact peer and designating timeslots in a downlink portion of the frame as a peer-to-peer resource or removing peer-to-peer designated resources from the downlink portion of the frame when there are no stations in proximity to each other that do not list the node as a high impact peer.

16. The node of claim 15, wherein the allocating unit is configured to determine that one or more stations is capable of receiving a predefined modulation and designate a portion of timeslot with the uplink portion of the frame as a peer-to-peer resource or remove a resource designated as a peer-to-peer resource from the uplink portion of the frame when no station is capable of receiving the predefined modulation.

17. The node of claim 13, wherein a modulation transmitted by the transmitter station to the one or more receiver stations is compatible with an existing time coincident transmission when an allocated peer-to-peer resource is taken from a uplink portion or a downlink portion of a frame, wherein the uplink portion or the downlink portion is not exclusive to peer-to-peer communication links or
wherein the modulation transmitted by the transmitter station to the one or more receiver stations is a predefined modulation that is different from an uplink modulation or a downlink modulation, wherein the uplink portion or the downlink portion is exclusive to peer-to-peer communication links.

18. The node of claim 13, wherein potential resources in the peer-to-peer portion of the resource allocation map originate from at least one portion of a frame partitioned for uplink, downlink or dedicated peer-to-peer communication links.

19. The node of claim 13, wherein the determining unit is configured to select a preferred peer link as a link where both the transmitter station and a receiver station are low impact peers of the node and are medium or high impact peers of each other and wherein a downlink transmission from the node to the transmitter station or the receiver station can occur in the same timeslot as peer-to-peer communication between the transmitter station and the receiver station.

20. The node of claim 13, wherein the allocating unit is configured to reallocate resources when one or more selected communication links between the transmitter station and the one or more receiver stations are insufficient to maintain communications between the transmitter station and the one or more receiver stations.

* * * * *